(12) United States Patent
Liu et al.

(10) Patent No.: US 6,396,716 B1
(45) Date of Patent: May 28, 2002

(54) APPARATUS FOR IMPROVING STABILITY AND DYNAMIC RESPONSE OF HALF-BRIDGE CONVERTER

(75) Inventors: Chui-Pong Joe Liu; Ngai-Kit Franki Poon; Man-Hay Bryan Pong, all of Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 09/960,435

(22) Filed: Sep. 20, 2001

(51) Int. Cl.[7] ...................... H02M 3/335; H02M 7/5387
(52) U.S. Cl. ......................................... 363/17; 363/132
(58) Field of Search .................. 363/16, 17, 56.01, 363/56.02, 97, 98, 131, 132

(56) References Cited

U.S. PATENT DOCUMENTS 5,268,830 A * 12/1993 Loftus et al. .................. 363/17
6,144,172 A * 11/2000 Sun ............................. 315/291
6,188,209 B1 * 2/2001 Poon et al. .................. 323/255

OTHER PUBLICATIONS

Korotkov et al., "Small–Signal Modeling of Soft–Switched Asymmetrical Half–Bridge DC/DC Converter," 1995 IEEE, pp. 707–711.

Sebastian et al., "Small–Signal Modelling of the Half–Bridge Complementary–Control DC–to–DC Converter," 1995 IEEE, pp. 44–50.

* cited by examiner

Primary Examiner—Matthew Nguyen
(74) Attorney, Agent, or Firm—Pennie & Edmonds LLP

(57) ABSTRACT

Typically, in a half-bridge converter A DC blocking capacitor and inductance on the primary side combines with the inductor and capacitor on the secondary side to produce complicated converter dynamic characteristics that make converter stabilization difficult. The disclosed system and methods enable converter stabilization by modulating, as a function of the voltage across the DC blocking capacitor, the feedback output error signal or the ramp signal for the PWM controller of the converter. The modulation removes the effect of the resonant circuit formed by the primary inductance and the DC blocking capacitor in the output voltage regulation loop. Further adjustment of the duty cycle of the power switches enables keeping the output voltage undisturbed by voltage variation across the DC blocking capacitor. Since, this inner compensation loop results in the voltage regulation feedback loop respond to only the output inductor-capacitor filter, the transfer function of this loop displays second order characteristics from the fourth order. Hence, stability issues are simplified to conventional second order compensation network whereby the converter can be optimized for fast transient response.

12 Claims, 10 Drawing Sheets

Frequency →

Resonant point of L501 and C501
≅ 1.7KHz

Resonant point of inductor 116 and blocking capacitor 100 ≅ 1.7KHz

Upper trace: Gain in dB, 10dB/div
Lower trace: Phase in degree, 45°/div

Upper trace: Gain in dB, 10dB/div
Lower trace: Phase in degree, 45°/div

Frequency →

Resonant point of L501 and C501
≅ 1.7KHz

Resonant point of inductor 116 and blocking capacitor 100 ≅ 1.7KHz

US 6,396,716 B1

APPARATUS FOR IMPROVING STABILITY AND DYNAMIC RESPONSE OF HALF-BRIDGE CONVERTER

FIELD OF THE INVENTION

This invention relates to the field of power converter, in particular to the field of feedback compensation in complementary driven half-bridge converters.

BACKGROUND OF THE INVENTION

Zero voltage switching reduces switching losses significantly and greatly improves converter efficiency especially when the bridge voltage is high and capacitance loss is significant. Furthermore, Zero voltage switching allows higher switching frequency for the bridge switches as well as use of smaller components.

Placing a DC blocking capacitor on the primary side of a converter results in an improved half bridge topology that provides zero voltage switching. This enables use of the complementary driving method, together with inductance on the primary side, for zero voltage switching of half-bridge switches.

Despite its many advantages, the complementary driving method has not been widely employed in half-bridge converters due to the complexity encountered in actual implementations. Small signal analysis of a circuit for a typical half-bridge converter reveals that the primary DC blocking capacitor and magnetizing inductance of the main transformer produce a second order resonant circuit. On the secondary side, output filter inductor and capacitor produce another resonant circuit. Together these two circuits form a fourth order system that is complex and consequently difficult to stabilize.

A number of researchers have addressed this problem but without forwarding a satisfactory solution. For instance, Korotkov et al. showed that the phase shift approaches 360 degrees when the both resonant circuits take effect with the aid of the theoretical Bode plot and the phase plot on the transfer function. Korotkov et al., "Small-signal modeling of soft-switched asymmetrical half-bridge DC/DC converter" in the *Applied Power Electronics Conference and Exposition* on pages 707–11 in 1995. This phase shift can result in stability problems with use of negative feedback for regulating the output voltage.

While it is possible to solve the stability problem by rolling off the open loop gain to less than one before both of the two resonant circuits take effect this results in other undesirable consequences. For instance, this greatly impairs the dynamic response of the converter along with additional limitations in the design of the feedback compensation network.

Sebastian et al. suggested another solution in the paper titled "Small-signal modeling of the half-bridge complementary-control DC-to-DC converter" in the *Power Electronics Congress* of 1995. Accordingly, ensuring a much greater resonant frequency for the output LC filter than the circuit comprising the primary magnetizing inductance and the DC blocking capacitor reduces the phase shift of asymmetrical half-bridge converter to less than 180 degrees. However, this method has limited applicability due to the limitation placed on the output filter design resulting in incompatibility with many normal converter specifications.

SUMMARY OF THE INVENTION

The present invention provides a system and method to reduce the aforementioned complexity enabling better regulation of the output voltage in a half-bridge converter with complementary drive. The system and method taught by the present invention do not require limitations on the choice of resonant frequencies in the half-bridge or a fall-bridge converter. In example embodiments of the invention, the voltage regulating feedback loop sees only the second order output inductor-capacitor filter. Therefore, ordinary second-order compensation can stabilize the loop and provide optimization more readily for better dynamic response.

An illustrative embodiment of the present invention includes modulation of a voltage ramp signal or an output error feedback voltage as a function of the voltage across the DC blocking capacitor. A comparator of the Pulse Width Modulation (PWM) controller controlling the power switches receives the modulated signal. This inner compensation loop eliminates the effect of voltage variation across the DC blocking capacitor.

Moreover, the present invention allows furher optimization of the dynamic response of half-bridge converters and full-bridge converters. This follows, in part, from many embodiments in accordance with the present invention employing simple second-order compensation and conventional techniques to stabilize the output voltage-regulating loop of half-bridge converters with complementary drive.

Thus, possible variations include, without limitation, a controlled current source providing a current as a function of the DC blocking capacitor voltage of a half-bridge converter to produce the voltage ramp signal for the PWM controller. Alternatively, the voltage of a winding coupled to the main transformer of the half-bridge converter modulates the output voltage error signal followed by feed the error signal into the PWM controller. The winding has voltage proportional to the voltage across the DC blocking capacitor and in a desired phase to provide inner loop compensation. Another embodiment illustrates the present invention in full-bridge converters.

These and other aspects of the present invention will become apparent to those skilled in the art from the following detailed description of the invention and from the accompanying drawings.

BRIEF DESCRIPTION OF DRAWINGS

The invention is described herein with the aid of drawings to provide an understanding of the different aspects of the invention in a non-exhaustive manner. These drawings are illustrative rather than limiting as to the scope of the invention and should be interpreted accordingly.

DESCRIPTION OF THE PREFERRED EMBODIMENTS

Figure 1:
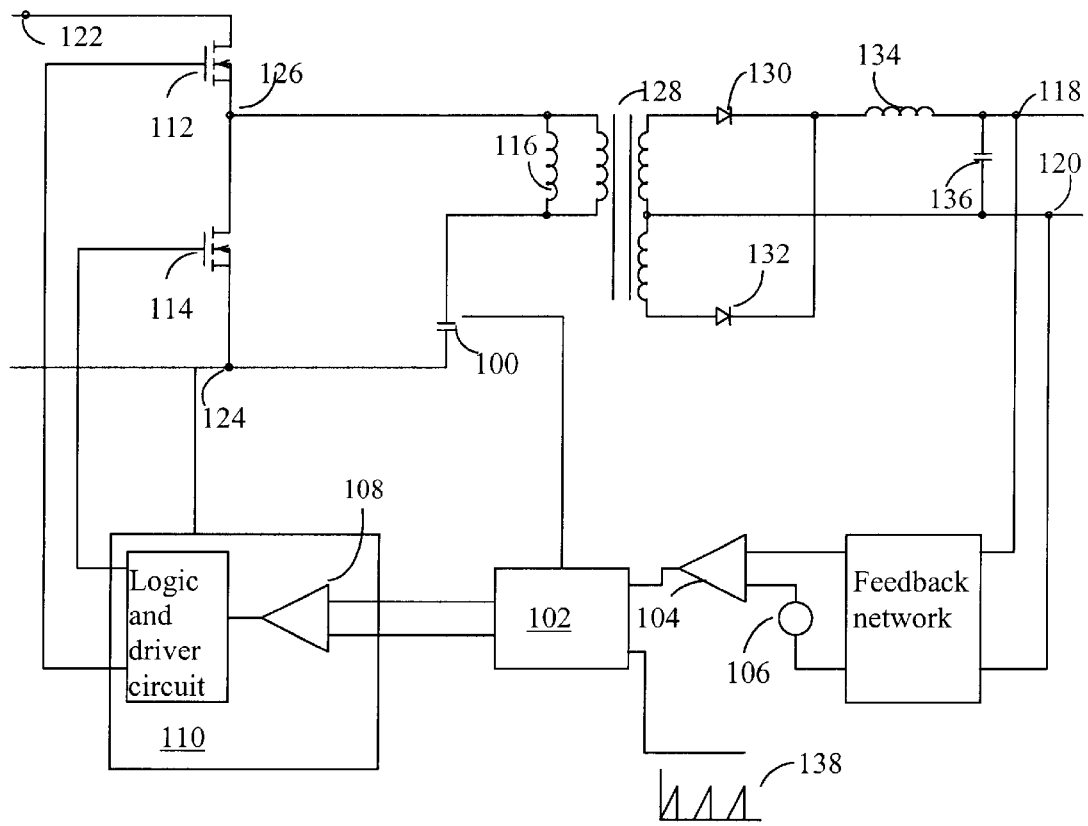
FIG. 1 is an illustration of a half-bridge DC-DC power converter with an inner compensation feedback loop and the output voltage regulation feedback loop.

The principle of operation of the present invention is described in FIG. 1. The various figures illustrate several design variations for implementing various embodiments of the invention mi a non-exhaustive manner. Different figures employ the similar numbers to label similar components with the leading digit representing the particular figure.

Thus, in FIG. 1, modulator 102 senses voltage across DC blocking capacitor 100 as the control signal. Modulator 102 modulates the output error signal with the control signal. Comparator 104 produces the output error signal by comparing the output voltage to a voltage provided by reference 106 in conjunction with a feedback network. The modulated output error signal is, next, applied to comparator 108 of PWM controller 110. The phase of the control signal is modified so that PWM controller 110 senses voltage variations across capacitor 100. PWM controller 110 responds to the changes in control signal and the resultant modulated output error signal by adjusting the duty cycle of the half-bridge to control switches 112 and 114 in order to counteract variations in the output voltage. This feedback eliminates the effect of voltage variation across DC blocking capacitor 100 on the output voltage. Therefore, the effect of the resonant circuit formed by primary equivalent magnetizing inductance 116 and DC blocking capacitor 100 is removed from the voltage regulating loop.

Figure 2:
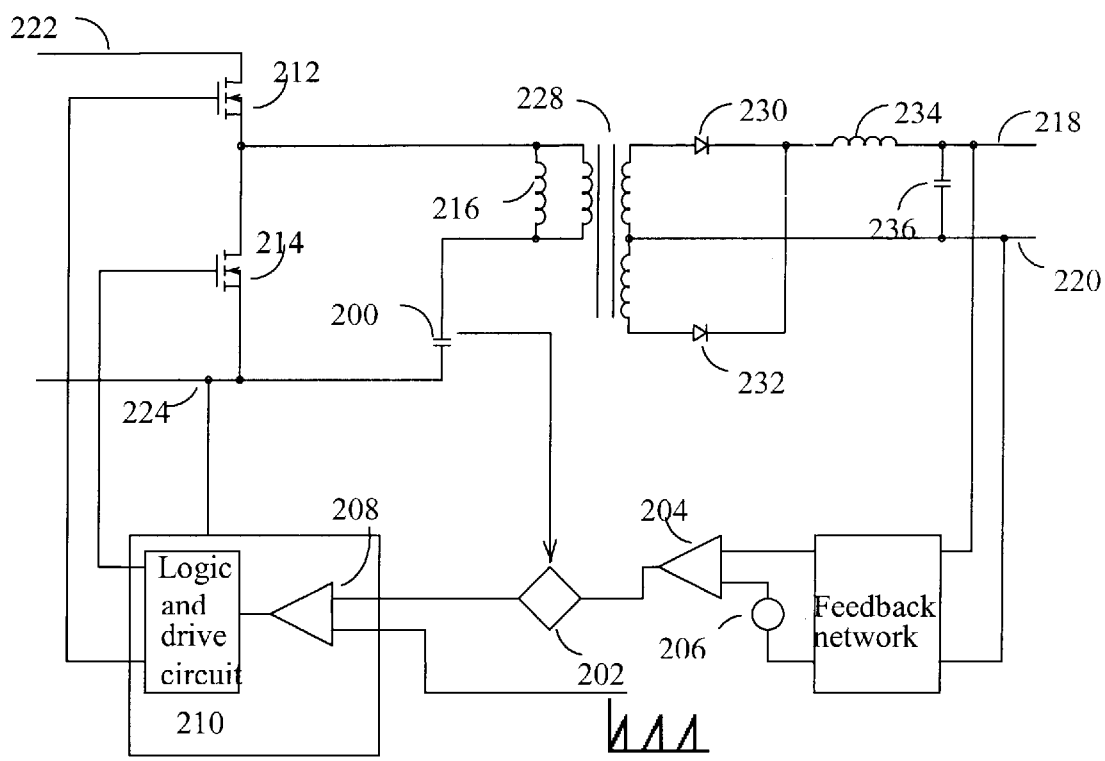
FIG. 2 illustrates a half-bridge converter, in an embodiment of the invention, using a voltage related to the DC blocking capacitor to modulate the output error signal feedback in an inner compensation loop.

In the design described above, the duty cycle controls the power converter. The PWM controller 110 determines the duty cycle d with the aid of the output of internal comparator 108. Accordingly, the duty cycle is related to the difference of this internal comparator's inputs, the modulated output error signal and a ramp signal as shown in eqn. 1.

$$d \approx (V_{control} + V_{output\_error}) - V_{ramp} \qquad \text{eqn. 1}$$

where $V_{control}$ is the control signal modulating the output error signal $V_{output\_error}$, and $V_{ramp}$ is the ramp signal. FIG. 2 illustrates such an embodiment with modulator 202 receiving the control signal and the output error signal.

Rearranging eqn. 1, an equivalent equation is obtained as shown in eqn. 2.

$$d \approx V_{output\_error} - [V_{ramp} + (-V_{control})] \qquad \text{eqn. 2}$$

Figure 3:
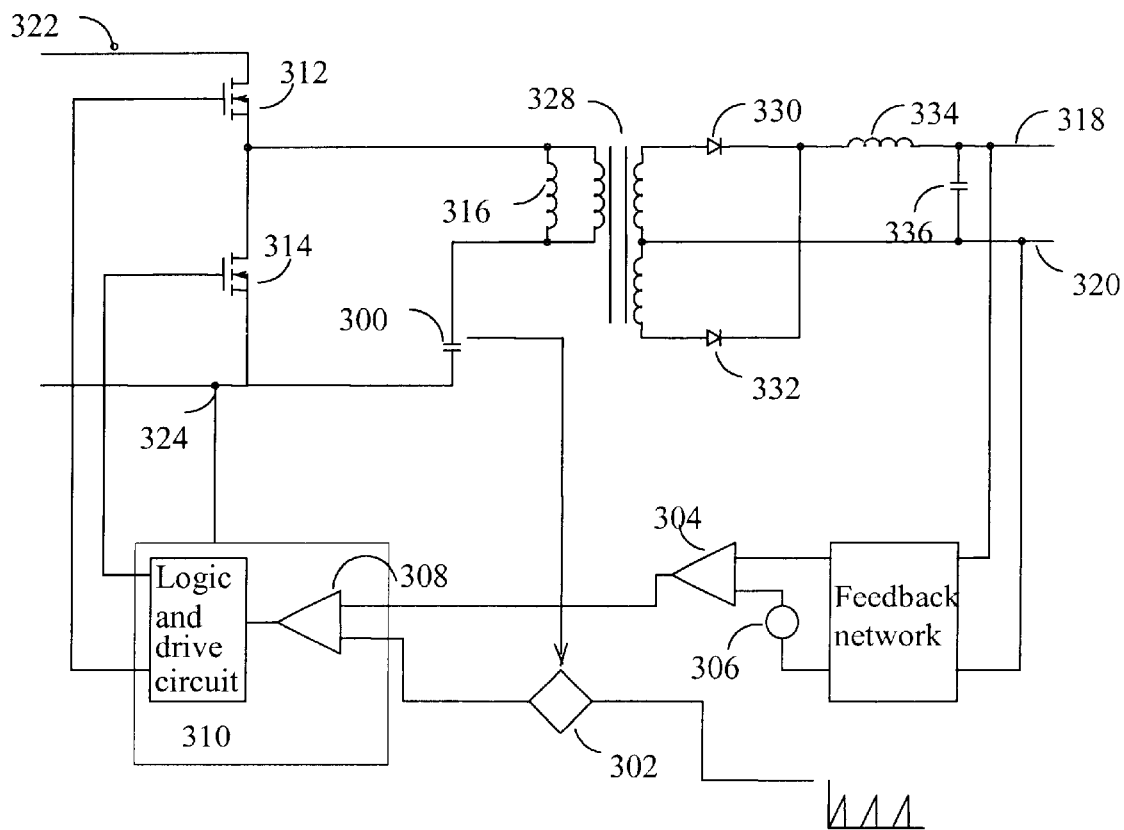
FIG. 3 illustrates a half-bridge converter, in an embodiment of the invention, using a voltage related to the DC blocking capacitor to modulate the ramp signal in an inner compensation loop.

Eqn. 2 shows that following rearrangement the introduced control signal can be interpreted to modulate the ramp signal input of modulator 102 of FIG. 1. Of course, in the alternative arrangement the phase of the control signal is inverted as well to ensure consistency. FIG. 3 shows such an embodiment with modulator 302 receiving the ramp signal and the control signal.

Furthermore, the control signal, $V_{control}$, in an embodiment of the invention, also functions as a ramp signal. This is possible, for instance, when the slope of the ramp signal is a function of the voltage across the DC blocking capacitor 100. Then removing the separate ramp signal further simplifies the system as is shown in FIG. 4.

Figure 4:
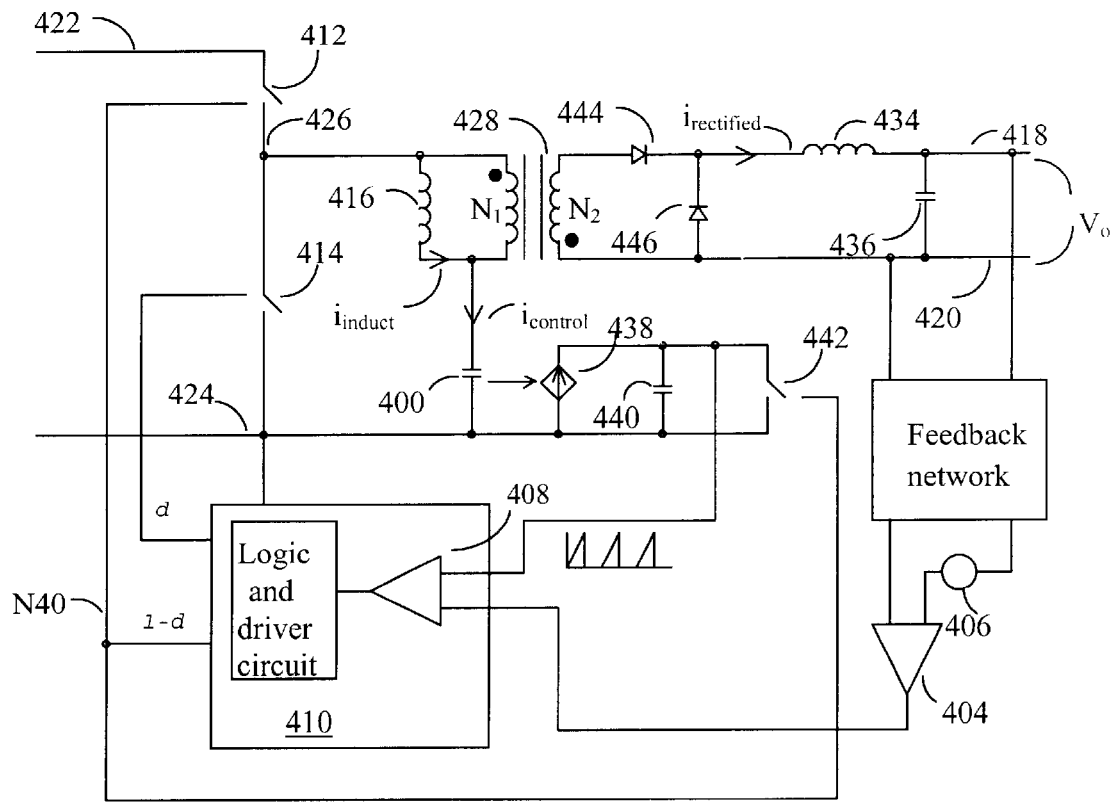
FIG. 4 illustrates an embodiment of the invention using a controlled current source to produce the modulation signal at the input of a PWM controller.

The embodiment shown in FIG. 4 consists of a half-bridge converter having output nodes 418 and 420 and a duty cycle (1−d) and (d) produced by PWM controller 410 driving switches 412 and 414. The switching operation of switches 412 and 414 converts the DC supply voltage from input nodes 422 and 424 to a pulsating voltage across nodes 426 and 424. Transformer 428 receives this pulsating voltage with DC blocking capacitor 400 blocking off the DC component. As shown, transformer 428, having primary and secondary windings with $N_1$ and $N_2$ turns respectively, presents magnetizing inductance reflected to the primary side as inductor 416. The aforesaid pulsating voltage is coupled to the secondary winding and rectified in half-wave configuration by diodes 430 and 432. The rectified current/voltage is then filtered to remove ripples by output filter formed by inductor 434 and capacitor 436 to provide smooth DC voltage output across output nodes 418 and 420.

The ramp signal received at comparator 408 in PWM controller 410 following modulation provides inner loop compensation as described previously. However, instead of using a constant ramp signal and like techniques, it is possible to employ a variable ramp signal. Several components, namely controlled current source 438, capacitor 440 and switch 442 generate this variable ramp signal in an embodiment illustrated in FIG. 4.

In FIG. 4, current source 438 has an amplitude proportional to the control signal sensed across DC blocking capacitor 400 with proportionality constant k. Switch 442 discharges capacitor 440 after duty cycle d is determined by the PWM controller. The following analysis although described in the context of FIG. 4 to illustrate the operation of the invention, is not intended to be limiting on the scope of the claimed invention.

Thus, the slope of the modulated voltage ramp signal M is $$M = \frac{i_{current\_source}}{C_{current\_source}} \qquad \text{eqn. 3}$$

This slope is not constant and depends on the voltage across blocking capacitor 400. Thus, $$M = \frac{k \cdot v_{control}}{C_{current\_source}} \qquad \text{eqn. 4}$$

where $V_{control}$ is the voltage across blocking capacitor 400, k is the proportionality constant and $C_{current\_source}$ is the capacitance of capacitor 440. Node 424 is the reference node for measuring voltage. The PWM controller 410 compares the ramp signal and the output error signal to produce duty cycle d. It can be shown that $$v_{output\_error} = \frac{k \cdot v_{control} \cdot d}{f_{sw} \cdot C_{current\_source}} \qquad \text{eqn. 5}$$

where $v_{output\_error}$ is the output error signal with node 424 being the reference node and $f_{SW}$ is the switching frequency of the converter.

Averaged small signal analysis provides the following 6 equations.

$$s \cdot L_{induct} \cdot \Delta i_{induct} = (1-D) \cdot \Delta v_{input} - \Delta v_{control} \qquad \text{eqn. 6}$$

$$\Delta i_{control} = \Delta i_{induct} - \frac{N_2}{N_1}(D \cdot \Delta i_{rectified} + I_{rectified} \cdot \Delta d) \qquad \text{eqn. 7}$$

$$\Delta v_{control} = \Delta i_{control} \frac{1}{s \cdot C_{control}} \qquad \text{eqn. 8}$$

$$\Delta v_o = \Delta i_{rectified} \frac{1}{s \cdot C_{ripple\_filter}} \qquad \text{eqn. 9}$$

$$\Delta v_{output\_error} = \frac{k}{f_{sw} \cdot C_{current\_source}}(D \cdot \Delta v_{control} + V_{control} \cdot \Delta d) \qquad \text{eqn. 10}$$

$$s \cdot L_{ripple\_filter} \cdot \Delta i_{rectified} = \frac{N_2}{N_1}(D \cdot \Delta v_{control} + V_{control} \cdot \Delta d) - \Delta v_o \qquad \text{eqn. 11}$$

where $v_{input}$ is the input voltage, $v_{control}$ is the voltage across blocking capacitor 400, $v_{output\_error}$ is the output error feedback voltage, and $v_o$ is the output voltage across output nodes 418 and 420. $\Delta$ represents the small perturbation of the parameter on its right hand side. D, $I_{rectified}$ and $V_{control}$ are the steady state values of d, $i_{rectified}$ and $v_{control}$ respectively.

Eqn. 10 is obtained directly by adding perturbation to eqn. 5 which is the effect produced by the inner compensation loop.

Solving eqn. 6–11 gives the transfer function from the output error feedback voltage, $v_{output\_error}$, to the output voltage $v_o$. This result is shown in eqn. 12.

$$\frac{\Delta v_o}{\Delta v_{output\_error}} = \frac{N_2}{N_1} \cdot \frac{f_{sw} \cdot C_{current\_source}}{k} \cdot \frac{1}{1+s^2 \cdot L_{ripple\_filter} \cdot C_{ripple\_filter}} \qquad \text{eqn. 12}$$

Eqn. 12 shows that the transfer function from the output error feedback voltage, $v_{output\_error}$, to the output voltage $v_o$ is second order, depending on the output filter formed by $L_{ripple\_filter}$ and $C_{ripple\_filter}$. This transfer function is independent of primary magnetizing inductance 434 and the DC blocking capacitor 400 due to the presence of the inner compensation loop.

The above calculations show the effect of inner loop compensation by using a voltage proportional to the voltage across the DC blocking capacitor, e.g., capacitor 400, to produce the ramp signal. Since the modulation signal is already a ramp signal, no extra ramp signal is required. The voltage variation on the DC blocking capacitor 400 introduces corresponding change in the duty cycle for controlling switches 412 and 414 to regulate the output voltage. Thus, the effect of the resonant circuit formed by the primary reflected magnetizing inductance and the DC blocking capacitor is removed and the control loop is greatly simplified and made more stable.

Figure 5:
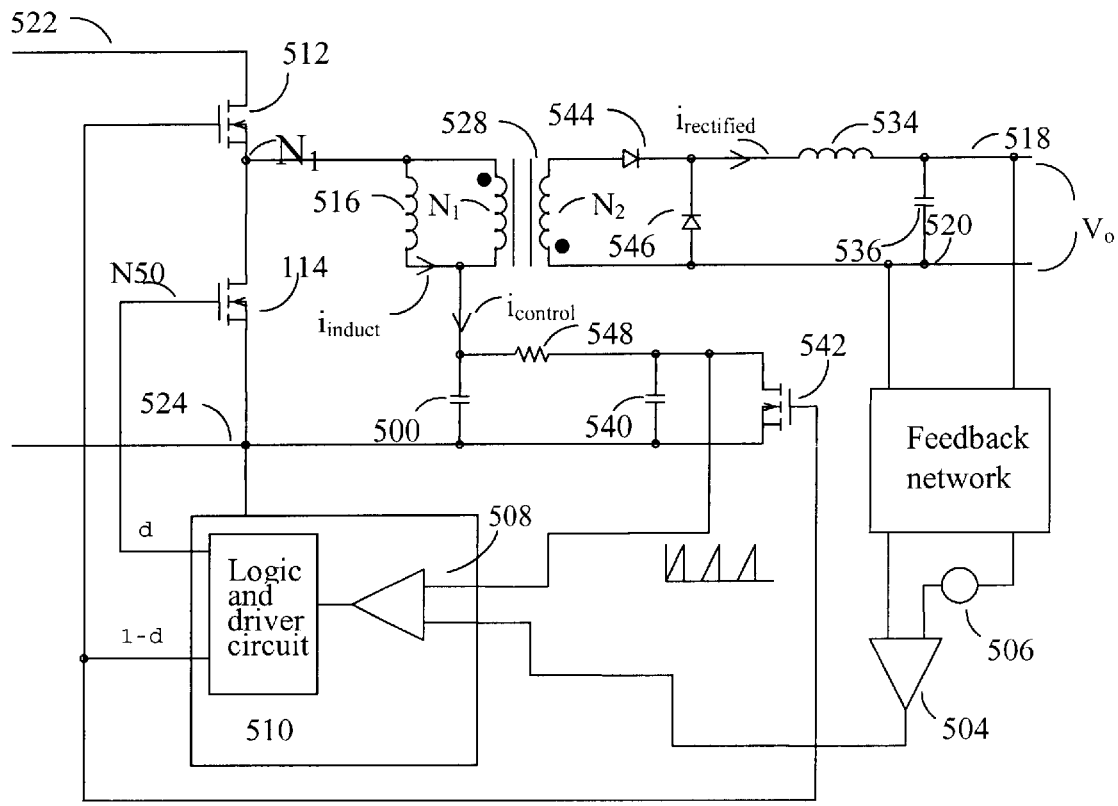
FIG. 5 illustrates a more detailed implementation of the power converter illustrated in FIG. 4.

FIG. 5 shows an embodiment of the invention. Resistor 548 and capacitor 540 produce the voltage ramp signal for the PWM controller 510 and switch 542. Resistor 548 connected to the DC blocking capacitor 500 detects the voltage variation across capacitor 900. The charging current injected to capacitor 540 is approximately equal to the voltage across capacitor 500 divided by the resistance of resistor 548 if the voltage of the ramp signal is much smaller than voltage across capacitor 500. This is also an illustrative example of the controlled current source described previously. The duty cycle d responds to the voltage variation of capacitor 500 to cancel out or reduced the effect on the output voltage $v_o$. This performs the inner loop compensation that removes or reduces the effect of the resonant circuit formed by the primary reflected magnetizing inductance 516 and the DC blocking capacitor 500.

Figure 6:
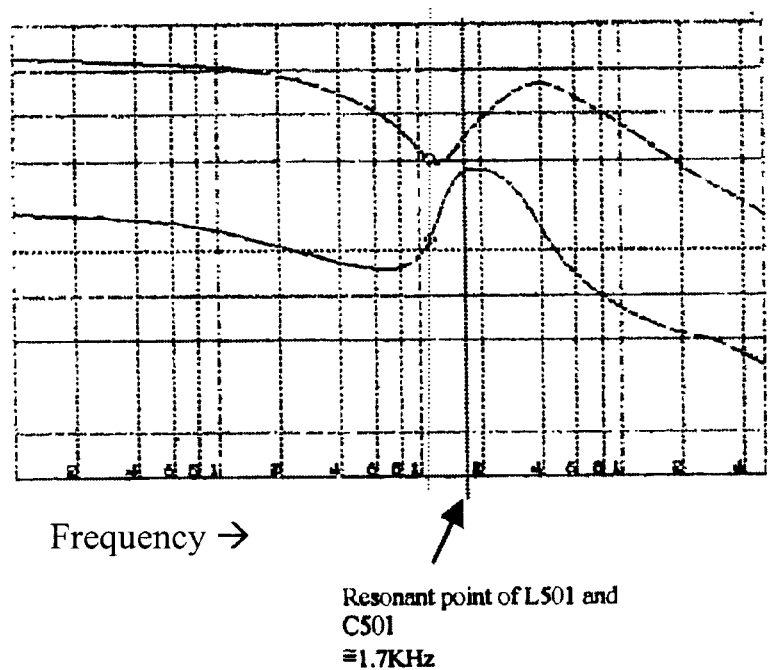
FIG. 6 is the measured Bode plot and phase plot in an embodiment similar to that illustrated in FIG. 1, but with no inner loop compensation.
Figure 7:
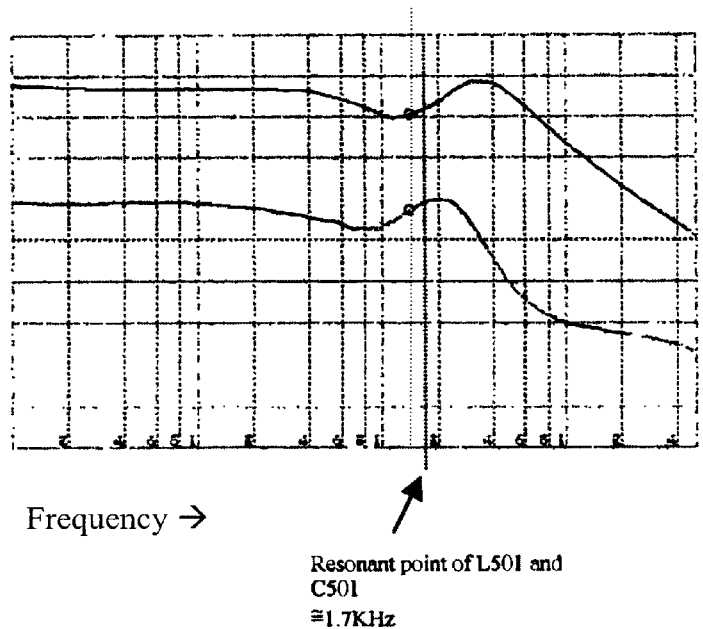
FIG. 7 shows the measured Bode plot and phase plot illustrating suppression of changes in phase and gain at 1.7 kHz, the resonant frequency of the DC blocking capacitor and the magnetizing inductance, relative to FIG. 6 by inner loop compensation.

FIGS. 6 and 7 show comparison of the gain plot and phase plot of the first embodiment without and with inner loop compensation respectively. A constant voltage ramp signal is applied to the PWM controller for the one without inner loop compensation. The circuit parameters used are as follows, $L_{induct}$=180 uH, the primary magnetizing inductance;

$C_{control}$=44 uF, the blocking capacitor;

$L_{ripple\_filter}$=1.2 uH, the inductance in output filter; and $C_{ripple\_filter}$=1200 uF, the capacitance in the output filter.

The resonant frequency of the resonant circuit formed by the primary reflected magnetizing inductance 516 and the DC blocking capacitor 500 is around 1.7 KHz and the resonant frequency formed by the output filter elements 534 and 536 is around 4 KHz. Specifically, FIG. 7 shows significant suppression of the effect of the resonant circuit elements inductor 516 and capacitance 500 in comparison with the FIG. 6 in which no inner loop compensation is implemented.

Figure 8:
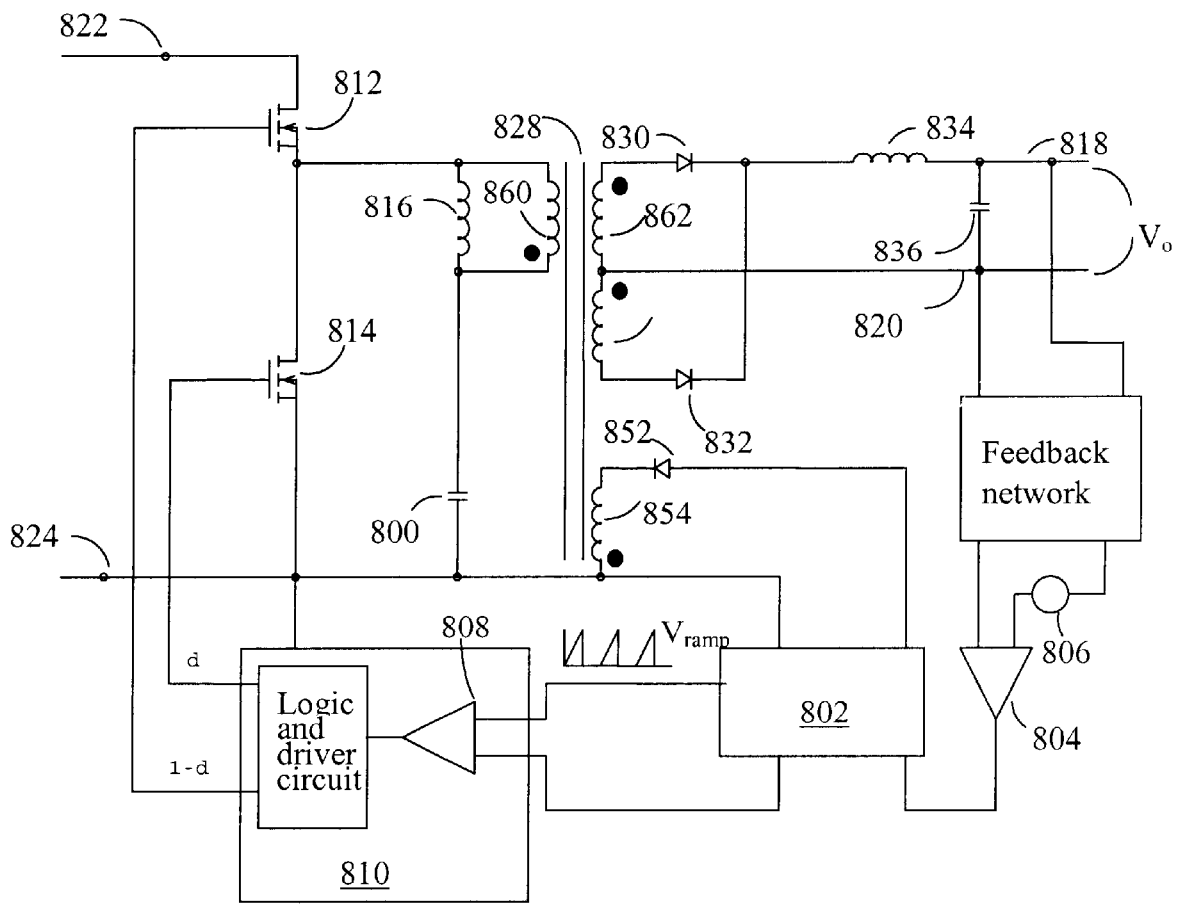
FIG. 8 shows an embodiment of the present invention illustrating the inner loop compensation by the signal obtained via voltage in a winding coupled to the main transformer of a half-bridge converter.

FIG. 8 shows another embodiment of the present invention which employs an additional winding 854 to sample the voltage accross DC blocking capacitor 800. Specifically, inner loop compensation is applied to a half-bridge converter with full wave rectification. Two switches 812 and 814 are driven with duty cycle (1–d) and (d) respectively by the PWM controller 810. The switching operation of switches 812 and 814 converts the DC supply voltage from node 822 and 824 to a pulsating voltage coupled to the main transformer 828 through a path including the DC blocking capacitor 800. Turning on switch 814 in accordance with duty cycle d applies the voltage across capacitor 800 to winding 856 of the main transformer 828. Moreover, this voltage is reflected onto coupled winding 854 of transformer 828. Thus, turning on switch 814 obtains, through winding 854, a voltage that is a function of the voltage across the DC blocking capacitor 800. Rectifier 852 and the phase of the winding 854 are arranged to produce the required voltage for the output error signal modulation. This voltage is a function of the voltage across the DC blocking capacitor 800 with the correct phase as described previously in order to ensure effective inner loop compensation. The modulation adjustment network 802 adjusts the level of modulation to suit PWM controller 810.

Figure 9:
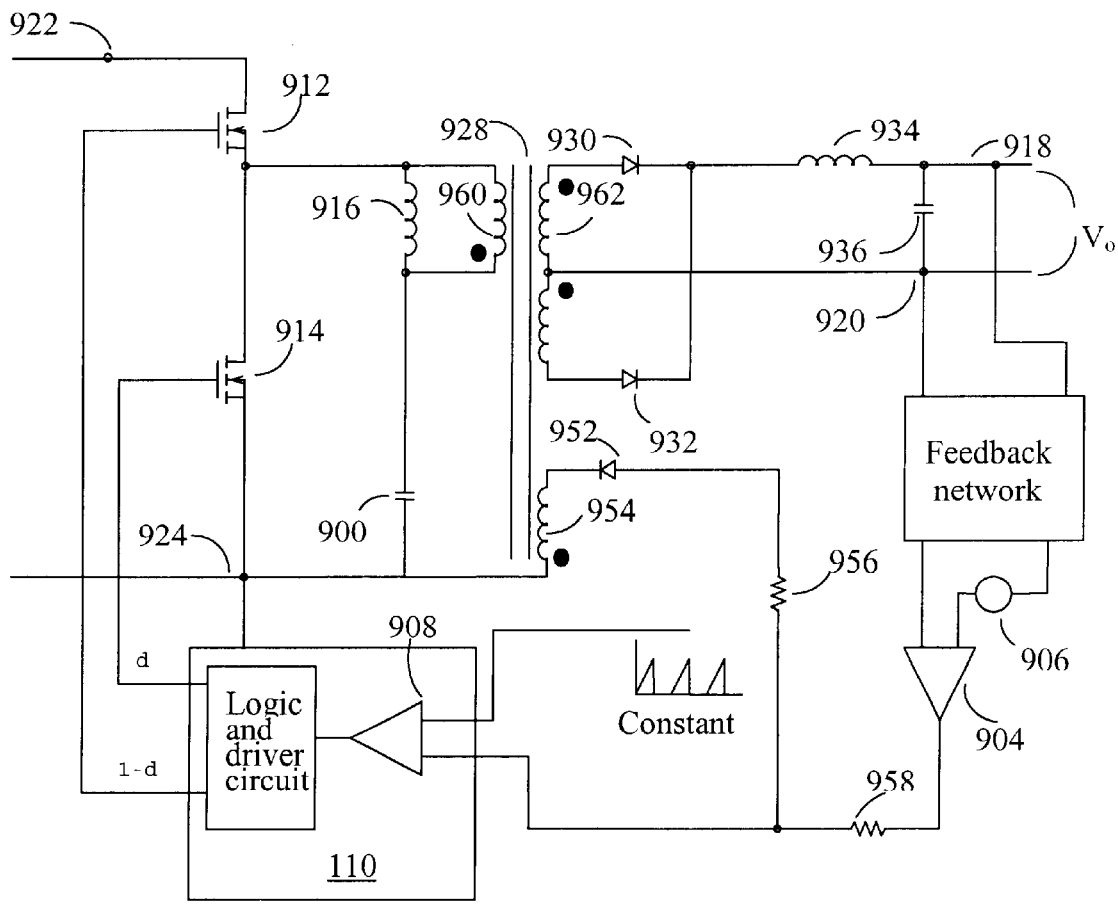
FIG. 9 is an implementation illustrating additional design details in an embodiment similar to that depicted in FIG. 8.

FIG. 9 illustrates an embodiment employing two resistors 956 and 958 to implement modulation network 902 similar to modulation network 802. To this end, the following equation shows the modulated error signal vmod output error at the input to comparator 908 of PWM controller 910 with the drop across diode 952 ignored.

$$v_{mod\_output\_error} = \frac{1}{R_{956}+R_{958}} \cdot \left( v_{output\_error} \cdot R_{956} - v_{control} \cdot \frac{N_4}{N_1} \cdot R_{958} \right) \qquad \text{eqn. 13}$$

$v_{output\_error}$ is the output error signal, $v_{control}$ is the voltage across the DC blocking capacitor 900, $N_4$ and $N_1$ are the number of turns of winding 954 and the number of turns of winding 960 respectively while node 924 serves as the reference node in the above expressions.

Figure 10:
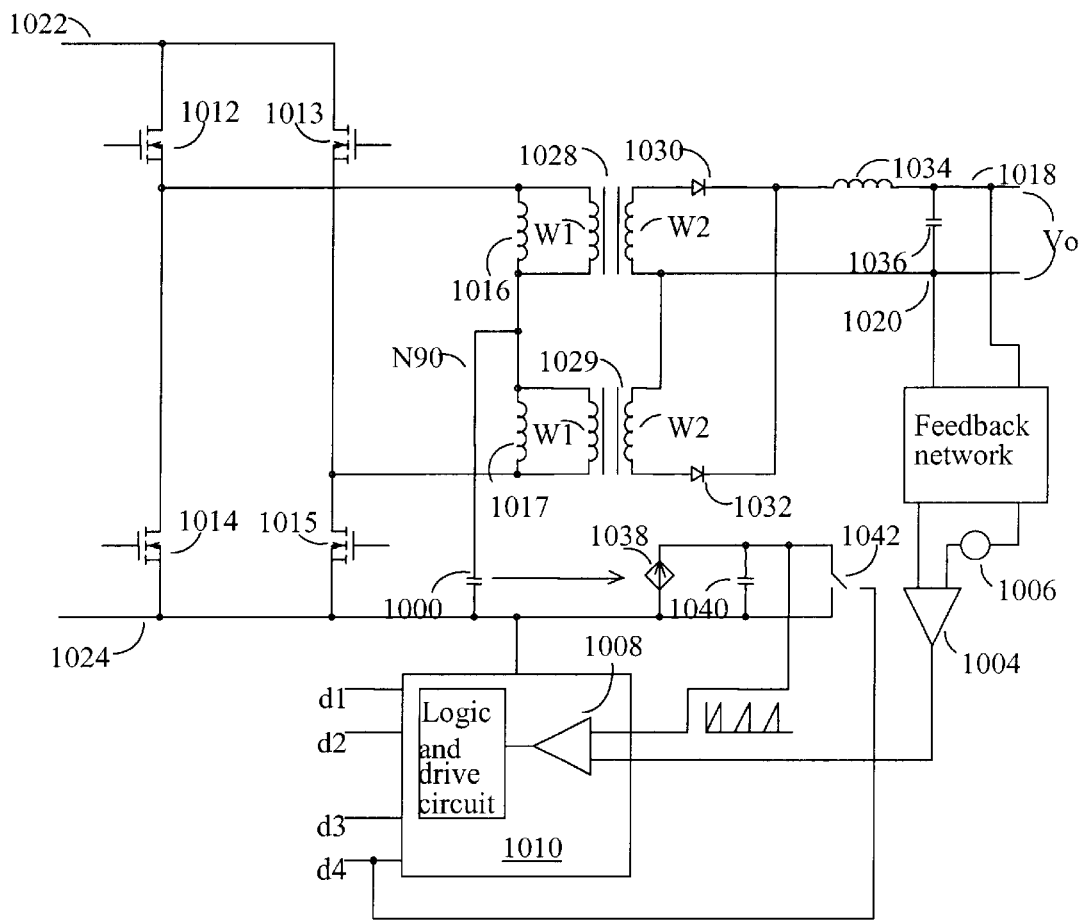
FIG. 10 shows a full bridge converter constructed in accordance with the present invention.

Another embodiment extends the present invention to a full bridge converter as shown in FIG. 10. FIG. 10 illustrates DC input applied to input nodes 1022 and 1024. Switches 1012, 1013, 1014 and 1015 are connected in full bridge configuration and driven by duty cycles d1, d2, d3 and d4 respectively to convert the DC input to a pulsating voltage coupled to transformers 1028 and 1029. The DC blocking capacitor 1000 prevents DC from entering transformers 1028 and 1029. The AC pulsating voltage couples to the secondary windings followed by rectification at rectifiers 1030 and 1032. A low pass output filter formed by inductor 1034 and capacitor 1036 provides a smooth DC output by reducing ripples.

The ramp signal for the PWM controller 1010 is modulated by the voltage across the DC blocking capacitor 1000 through the controlled current source $i_{constant\_current}$ 1038. The operational principles behind the functioning of this embodiment are similar to those illustrated previously except that the present embodiment extends to a full-bridge converter. The duty cycles d1, d2, d3, and d4 obtained from the PWM controller 1010 for driving the four switches 1012, 1014, 1013 and 1015 are adjusted in response to the modulated ramp signal. Of course, in this arrangement, voltage variation across capacitor 1000 is reflected in the modulated ramp signal to produce the desired inner loop compensation.

Therefore, there are disclosed several designs and principles for designing a power converter for DC to DC voltage conversion to generate a desired and easily regulated output voltage. Such a power converter includes input terminals for receiving power, at least one switch coupled to the input terminals to generate a variable current in accordance with a duty cycle; a magnetic component suitable for transforming the variable current to generate a transformed current; an input capacitor coupled to magnetic component; a rectifying circuit for rectifying the transformed current to generate a rectified current; a filter for smoothing the rectified current at output terminals; a feedback network generating an error signal reflecting deviation of a voltage at the output terminals from a desired reference; and a controller receiving the error signal, sensing the voltage across the input capacitor and responsive to a ramp signal for generating driving signals to operate the at least one switch in accordance with the duty cycle whereby the power converter operates as a closed loop feedback system. Variations and enhancements include different modulation schemes, use of current sources, different methods for sampling the voltage across one or more blocking capacitors of interest and extension to full-bridge power converter design.

Although the preceding description of the invention is in the context of the embodiments described herein, this is not intended to be a limitation on the scope of the invention. As readily recognized by one of ordinary skill in the art, the disclosed invention encompasses the disclosed embodiments along with other embodiments providing different filter configurations, diodes, rectifiers and magnetic materials. These variations are intended to be within the scope of the following claims.

What is claimed is:

1. A power converter for DC to DC voltage conversion to generate a desired regulated output voltage, the power converter comprising:

input terminals for receiving power;

at least one switch coupled to the input terminals to generate a variable current in accordance with a duty cycle;

a magnetic component suitable for transforming the variable current to generate a transformed current;

an input capacitor coupled to magnetic component;

a rectifying circuit for rectifying the transformed current to generate a rectified current;

a filter for smoothing the rectified current at output terminals;

a feedback network generating an error signal reflecting deviation of a voltage at the output terminals from a desired reference; and a controller receiving the error signal, sensing the voltage across the input capacitor and responsive to a ramp signal for generating driving signals to operate the at least one switch in accordance with the duty cycle whereby the power converter operates as a closed loop feedback system.

2. The power converter of claim 1 wherein the voltage across the input capacitor modulates the error signal in a modulator.

3. The power converter of claim 1 wherein the voltage across the input capacitor modulates the error signal in a modulator.

4. A power converter for DC to DC voltage conversion to generate a desired regulated output voltage, the power converter comprising:

input terminals for receiving power;

switches coupled to the input terminals to generate a variable current;

a magnetic component suitable for transforming the variable current to generate a transformed current;

an input capacitor coupled to magnetic component;

a rectifying circuit for rectifying the transformed current to generate a rectified current;

a filter for smoothing the rectified current;

output terminals coupled to the filter to provide the rectified current following smoothing;

a current source generating a current in response to a voltage across the input capacitor;

a current source capacitor coupled to the current source to be charged up by the current source;

at least one switch to discharge the current source capacitor periodically to generate a ramp signal;

a feedback network generating an error signal reflecting deviation for a voltage at the output terminals from a desired reference; and a controller receiving the error signal and the ramp signal for generating driving signals to operate the switches in accordance with a duty cycle whereby the power converter operates as a closed loop feedback system.

5. A power converter for DC to DC voltage conversion to generate a desired regulated output voltage, the power converter comprising:

input terminals for receiving power;

switches coupled to the input terminals to generate a variable current in accordance with a duty cycle;

a magnetic component suitable for transforming the variable current to generate a transformed current;

an input capacitor coupled to magnetic component;

a rectifying circuit for rectifying the transformed current to generate a rectified current;

a filter for smoothing the rectified current;

output terminals coupled to the filter to provide the rectified current following smoothing;

a second magnetic component magnetically coupled to first magnetic component to provide a control signal related to the voltage across the input capacitor;

a feedback network generating an error signal reflecting deviation for a voltage at the output terminals from a desired reference; and a controller receiving the error signal, the control signal and a ramp signal for generating driving signals to operate the switches in accordance with the duty cycle whereby the power converter operates as a closed loop feedback system.

6. The power converter of claim 5 further comprising a rectifier coupled to the second magnetic component to produce the signal related to the voltage across the input capacitor.

7. The power converter of claim 6 wherein the control signal modulates the error signal in a modulator.

8. The power converter of claim 6 wherein the voltage across the input capacitor modulates the ramp signal in a modulator.

9. The power converter of claim 6 further comprising a first resistor for sensing the output error signal.

10. The power converter of claim 9 further comprising a second resistor for sensing the signal related to the voltage across the input capacitor, the second resistor coupled to the first resistor to produce a signal proportional to the difference between the output error signal and the signal related to the voltage across the input capacitor.

11. The power converter of claim 10 further comprising means to couple the first and second resistor together to produce a signal proportional to the difference between the output error signal and the signal related to the voltage across the input capacitor.

12. A method for simplifying the regulation of the output voltage in a half-bridge DC-DC power converter, the method comprising the steps of providing a DC blocking capacitor on a primary side of a magnetic component; sensing a voltage across the DC blocking capacitor as a control signal; generating a modulated output error signal from at least one members chosen from the set consisting of the control signal, an output error signal and a ramp signal; and determining a duty cycle to drive at least one switch in an input path for power input into the power converter in response to receiving the modulated output error signal at a PWM controller.

* * * * *